May 29, 1951 R. F. MALLINA 2,554,835
RECORDING SYSTEM
Filed June 25, 1947
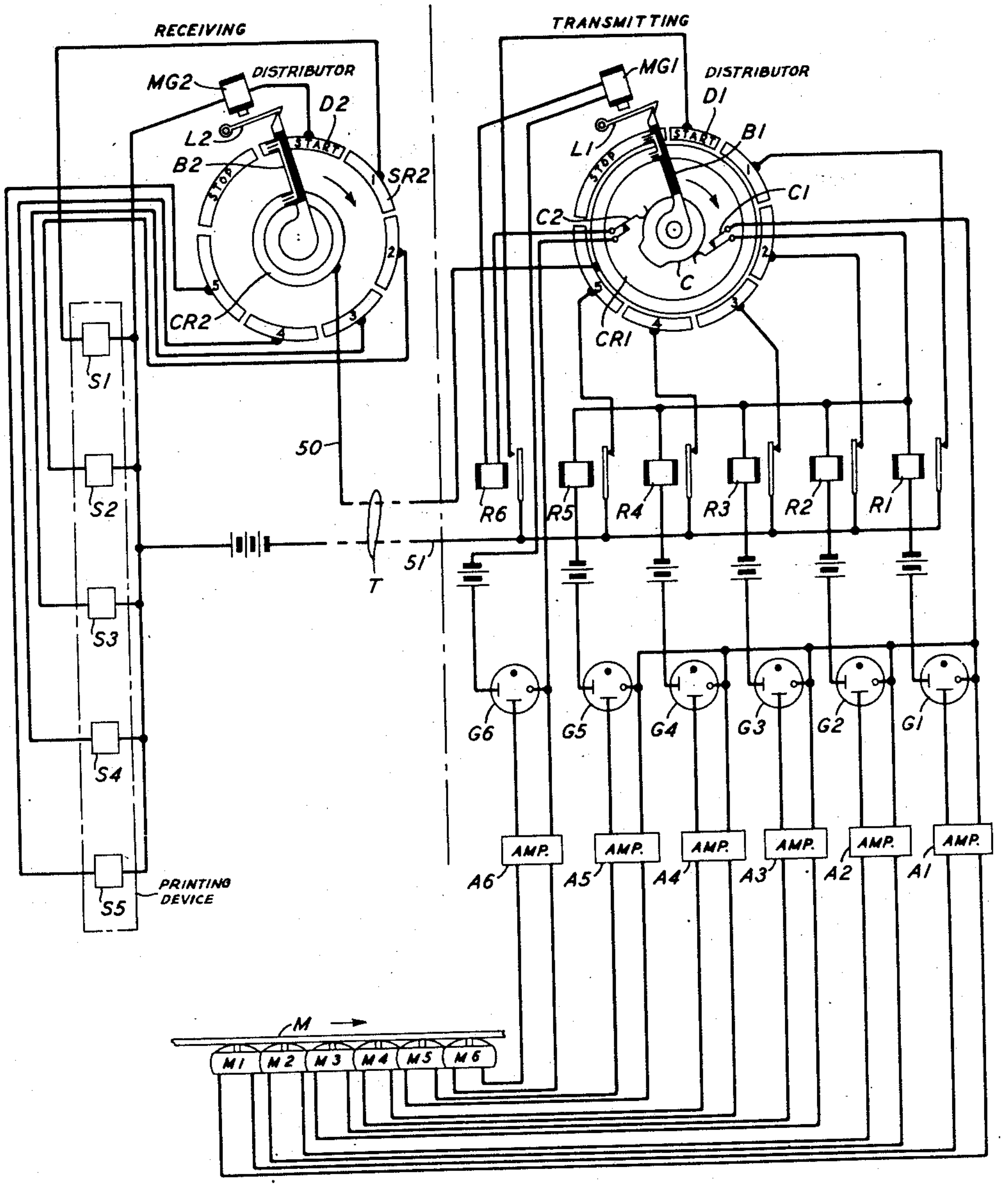
INVENTOR
R. F. MALLINA
BY
ATTORNEY Patented May 29, 1951 2,554,835

UNITED STATES PATENT OFFICE 2,554,835

RECORDING SYSTEM

Rudolph F. Mallina, Hastings on Hudson, N. Y., assignor to Bell Telephone Laboratories, Incorporated, New York, N. Y., a corporation of New York Application June 25, 1947, Serial No. 756,870

1 Claim. (Cl. 178—17)

This invention relates to recording systems and more particularly to systems in which recording devices are operated in response to magnetic signals.

A magnetic recorder provides a convenient method of recording information since a large amount of information may be recorded on a small bulk of magnetic medium. Magnetized spots may be produced on the magnetic medium arranged in patterns to represent letters, figures or characters of any kind. This method of recording is well known. However, the magnetic medium then presents no record readable visually nor is an audible reproduction of such a record intelligible. The present invention discloses a means whereby a printing device may be controlled by such a magnetic record to produce a readable presentation of the recorded material.

The objects and features of the invention will be apparent from the accompanying description, the appended claim and the drawing which shows schematically the elements of a recording system in accordance with the invention.

In the drawing, M is a magnetic medium on which magnetic signals are recorded by any suitable means in six parallel paths or tracks. Six reproducing magnets M1 . . . M6 are arranged in contact with said medium and so positioned that each of said magnets contacts one of said tracks when the magnetic medium is traversed by any suitable means (not shown) in the direction of the arrow. Associated with each of said reproducing magnets is an amplifier A1 . . . A6, which may be of any suitable type, a discharge tube G1 . . . G6, and a relay R1 . . . R6. The discharge tubes G1 . . . G6 may be cold-cathode triode gas tubes, as indicated, or other suitable discharge devices. A difference of potential is normally maintained between the anode (the left-hand element in the drawing) and the cathode (the right-hand element in the drawing) of each of said tubes by the connection of the positive pole of a battery to the anode, as shown, and the connection of the negative pole of said battery to the cathode through the winding of one of the relays R1 . . . R6. The negative pole of the battery is connected to the cathode of tube G1, for example, through the winding of relay R1 and contacts C1. The connections to the cathodes of tubes G2 . . . G5 are made over similar circuits through the windings of relays R2 . . . R5, respectively. Negative battery is normally connected to the cathode of tube G6 through the winding of magnet MG1, the winding of relay R6, and contacts C2. Said difference of potential is not sufficient to cause any of said tubes to conduct unless the potential of the starting anode of said tube is made sufficiently positive with respect to the cathode of said tube, as described hereinafter.

The magnetic recorder represented by the medium M and the reproducing magnets M1 . . . M6, together with the amplifiers A1 . . . A6, the tubes G1 . . . G6, the relays R1 . . . R6, and the distributor D1 (more particularly described below) constitute the transmitting portion of the system. The receiving portion of the system comprises a commercially-available printing device. This instrument is well known and only such portions of its mechanism and circuits as are necessary to an understanding of the operation of the invention are here disclosed schematically. The magnets S1 . . . S5 are the selector magnets of the printing device, such as are shown, for example, in the patent to Edward E. Kleinschmidt No. 1,564,422 issued December 8, 1925, and designated 22 therein. The receiving portion of the system also includes the distributor D2 comprising a brush arm B2 connected by frictional means to a continuously-turning motor or other suitable driving means, not shown. Said brush arm is normally restrained from rotation by the latch L2 which engages its outer end. If, however, the latch L2 is lifted by momentarily energizing the magnet MG2, the brush arm B2 is rotated by the driving means in the direction of the arrow, its electrically-connected brushes traversing the continuous ring CR2 and the segmented ring SR2, until the outer end of said brush arm once more engages the latch L2. The transmitting distributor D1 may, as shown, be similar to the receiving distributor D2 with the addition of the cam C, attached to brush arm B1, and the associated contacts. Cam C is so arranged with respect to the brush arm B1 that contacts C2 are opened by said cam when the brush arm B1, in rotating, is passing over the "start" segment of distributor D1, and contacts C1 are opened when said brush arm is passing over the "stop" segment of said distributor. The transmitting distributor D1 should also be driven at approximately the same speed as distributor D2, so that, if the brush arms of the two distributors are simultaneously released, they will rotate not necessarily in synchronism but in approximate alignment. The two distributors D1 and D2 are connected by the transmission line T.

The selector magnets S1 . . . S5 are adapted, when operated in combinations, to actuate selector bars of the printing device to cause said printing device to print characters in the well-known manner.

At each revolution of the brush arm of distributor D2, the printing device prints one character in accordance with the combination of selector magnets S1 . . . S5 operated during said revolution. For example, by the operation of combinations of selector magnets, the following characters are printed:

| Selector Magnets; Operated | Characters Printed |
|---|---|
| S1, S2 | A |
| S1, S4, S5 | B |
| S2, S3, S4 | C |

Other characters are produced by other combinations of operated selector magnets, in accordance with any suitable code.

When the magnetic medium M is traversed past the reproducing magnets M1 . . . M6, signals recorded on said medium may be simultaneously encountered by more than one of said magnets. Assuming that signals are encountered by magnets M1, M5 and M6, a voltage is induced in the winding of magnet M1, which, transmitted to amplifier A1, is amplified therein, raising the potential of the starting anode of gas tube G1 so that said tube conducts, completing a circuit from positive battery through the anode-cathode space of said tube, contacts C1 and winding of relay R1 to negative battery, over which relay R1 operates. A voltage is also similarly induced in the winding of magnet M5 causing, in a similar manner, the operation of relay R5. A voltage is likewise induced in the winding of magnet M6 which, through amplifier A6, causes gas tube G6 to conduct, completing a circuit from positive battery through the anode-cathode space of said tube, contacts C2, winding of relay R6 and winding of latch magnet MG1 to negative battery, over which relay R6 and magnet MG1 operate. The latch L1 is thereby lifted, allowing the brush arm B1 of distributor D1 to start rotation. When the outer brush of brush arm B1 reaches the "start" segment of distributor D1, a circuit is completed from positive battery through winding of magnet MG2, the start segment of distributor D2, brushes and continuous ring CR2 of said distributor, conductor 50, continuous ring CR1, brushes and "start" segment of distributor D1, contacts of relay R6, and conductor 51 to negative battery, over which magnet MG2 operates, lifting latch L2 and allowing brush arm B2 to rotate also. Although brush arm B1 of distributor D1 starts to rotate before brush arm B2 of distributor D2 starts, the relative locations of the segments of the two distributors are such that the outer brush of brush arm B2 is in contact with segment "1" of distributor D2 while the outer brush of brush arm B1 is in contact with segment "1" of distributor D1, and a similar condition obtains with respect to the other segments of the distributors.

When brush arm B2 passes away from the start segment of distributor D2, the circuit, traced above, of magnet MG2 is opened, releasing latch L2. Brush arm B1 also rotating, cam C opens contacts C2, opening the circuit, traced above, of relay R6, magnet MG1 and tube G6. Relay R6 and magnet MG1 are thereby released, releasing latch L1, and tube G6 returns to its non-conducting state.

When the brush arms B1 and B2 reach the "2" segments of their respective distributors, a circuit is completed from positive battery through the winding of selector magnet S2, "2" segment, brushes, and continuous ring CR2 of distributor D2, conductor 50, "2" segment, brushes and continuous ring CR1 of distributor D1, contacts of relay R2, and conductor 51 to negative battery, over which selector magnet S2 operates. When the brush arms B1 and B2 reach the "3" and "4" segments, similar circuits are completed over which selector magnets S3 and S4 operate. The operation of selector magnets S2, S3 and S4, in association with the selector bars and other mechanism of the teletypewriter cause the character "C" to be printed, in accordance with the code given above. Thus, it is seen that in the illustrated embodiment of my invention, the magnets of the printing device are selectively operated in response to signals which are the complement of the group of signals recorded on the medium M representing the character to be printed, though obviously, the circuit could easily be modified to cause said magnets to be selectively operated in response to the group of signals recorded rather than their complement.

When the brush arm B1 reaches the "stop" segment of distributor D1, cam C opens the contacts C1 thereby opening the circuits of relays R1 and R5 and gas tubes G1 and G5. Said relays are thereby released and said gas tubes return to their non-conducting condition. Brush arm B1 is arrested by latch L1 and brush arm B2 is arrested by latch L2. The circuits and apparatus are now in normal condition ready for the transmission and reception of another group of signals encountered by magnets M1 . . . M6 during the passage of medium M over said magnets. By suitably arranging the signals recorded on the medium M, any character within the range of the teletypewriter may be caused to be recorded in a manner similar to that described above for the character "C." While the means shown for transmitting and receiving combinations of six signals to control the printing of each character is adequate for the commercially-available teletypewriter, by obvious extension of the circuits and apparatus shown, combinations of more than six signals may be similarly employed to control recording apparatus in the manner described.

While I have illustrated my invention by one embodiment thereof and in one specific arrangement of parts, it will be apparent to one skilled in the art that said invention is equally applicable to other embodiments and arrangements. The terms and expressions which I have used in reference to this invention are used as terms of description and not of limitation and I have no intention in the use of such terms and expressions of excluding thereby equivalents or modifications of the features shown or described but, on the contrary, intend to include therein any and all equivalents or modifications which may be employed without departing from the spirit of the invention.

What is claimed is:

Apparatus for producing time-spaced impulses expressing a character according to the complement of a code for said character indicated by the portions of a moving magnetic medium magnetized on different tracks thereof, comprising in combination with said medium a magnet for sensing each track, a commutative distributor, and means interconnecting said magnets with said distributor and operative in response to the operation of one of said magnets when sensing the magnetized portion of the medium on the track thereof associated with said magnet for initiating the operation of said distributor, thereby to produce signaling impulses in response to the operation of the rest of said magnets when sensing magnetized portions of said medium on the tracks thereof respectively associated with said magnets, said signaling impulses being the complement of the code for the character indicated by the magnetized portions of the medium sensed by said last-mentioned magnets, said means comprising a circuit for each one of said magnets including an amplifier responsive to the operation of said magnet when sensing a magnetized portion of said medium, an electronic device in circuit with said amplifier rendered operative thereby, and a relay in circuit with said electronic device, said relay being rendered operative by said operated electronic device, one of said relays having a pair of normally open contacts and each of the other of said relays having a pair of normally closed contacts, said relay having the normally open contacts closing the same upon operation to complete a circuit for initiating the operation of said commutative distributor, each of said other relays opening its contacts on its operation in response to the operation of its associated magnet when sensing the magnetized portion of said medium on the track thereof associated with said magnet, those of said relays which are normal thereby completing impulse paths over their respective normally closed contacts and through commutating portions of said distributor, thereby to produce time-spaced impulses which are the complement of the code for the character indicated by the magnetized portions on said medium which are sensed by the magnets included in the circuits of the several relays having normally closed contacts.

RUDOLPH F. MALLINA.

REFERENCES CITED

The following references are of record in the file of this patent:

UNITED STATES PATENTS

| Number | Name | Date |
|---|---|---|
| 1,813,908 | Bethenod | July 14, 1931 |
| 2,000,764 | Lemmon et al. | May 7, 1935 |
| 2,023,446 | Schroeter | Dec. 10, 1935 |
| 2,131,322 | Higgitt et al. | Sept. 27, 1938 |
| 2,302,081 | Weitman | Nov. 17, 1942 |
| 2,382,251 | Parker et al. | Aug. 14, 1945 |
| 2,398,755 | Shepherd | Apr. 16, 1946 |